June 30, 1942.　　　　R. W. WESTON　　　　2,288,057
TRANSMISSION MECHANISM
Filed Aug. 10, 1938　　　　5 Sheets-Sheet 1
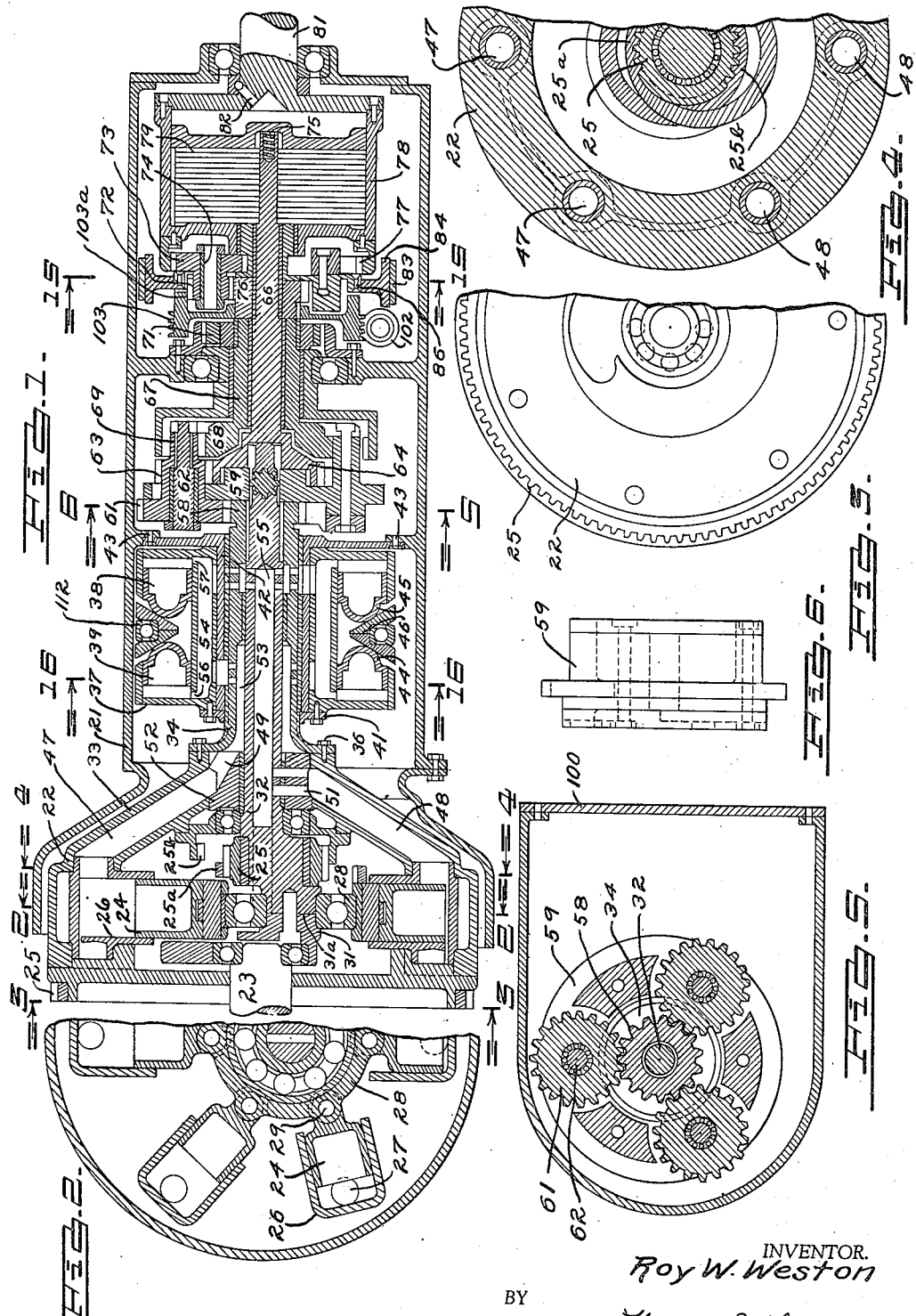
INVENTOR.
Roy W. Weston
BY
Thomas J. Hughes
ATTORNEY.

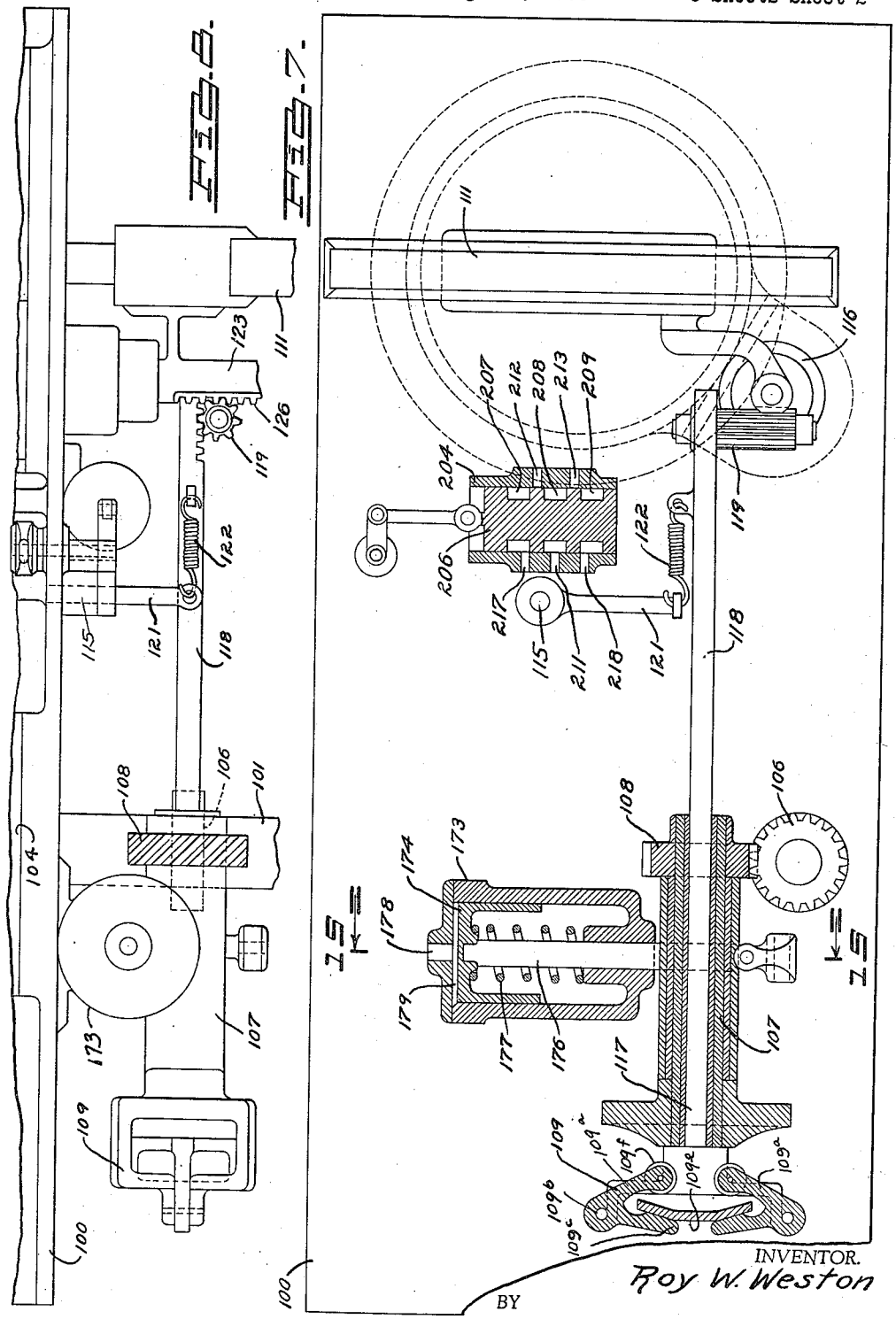

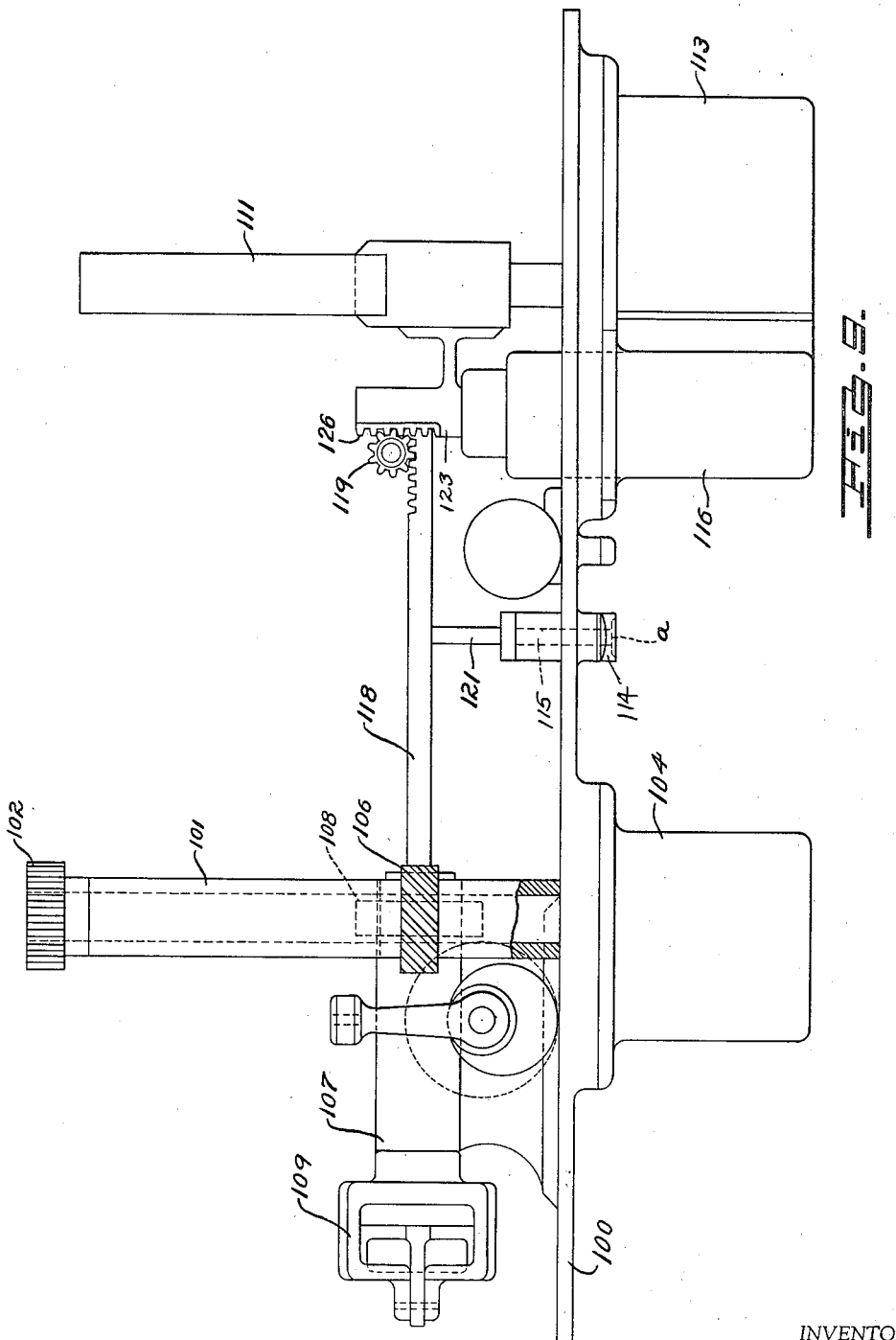

June 30, 1942.  R. W. WESTON  2,288,057
TRANSMISSION MECHANISM
Filed Aug. 10, 1938  5 Sheets-Sheet 4
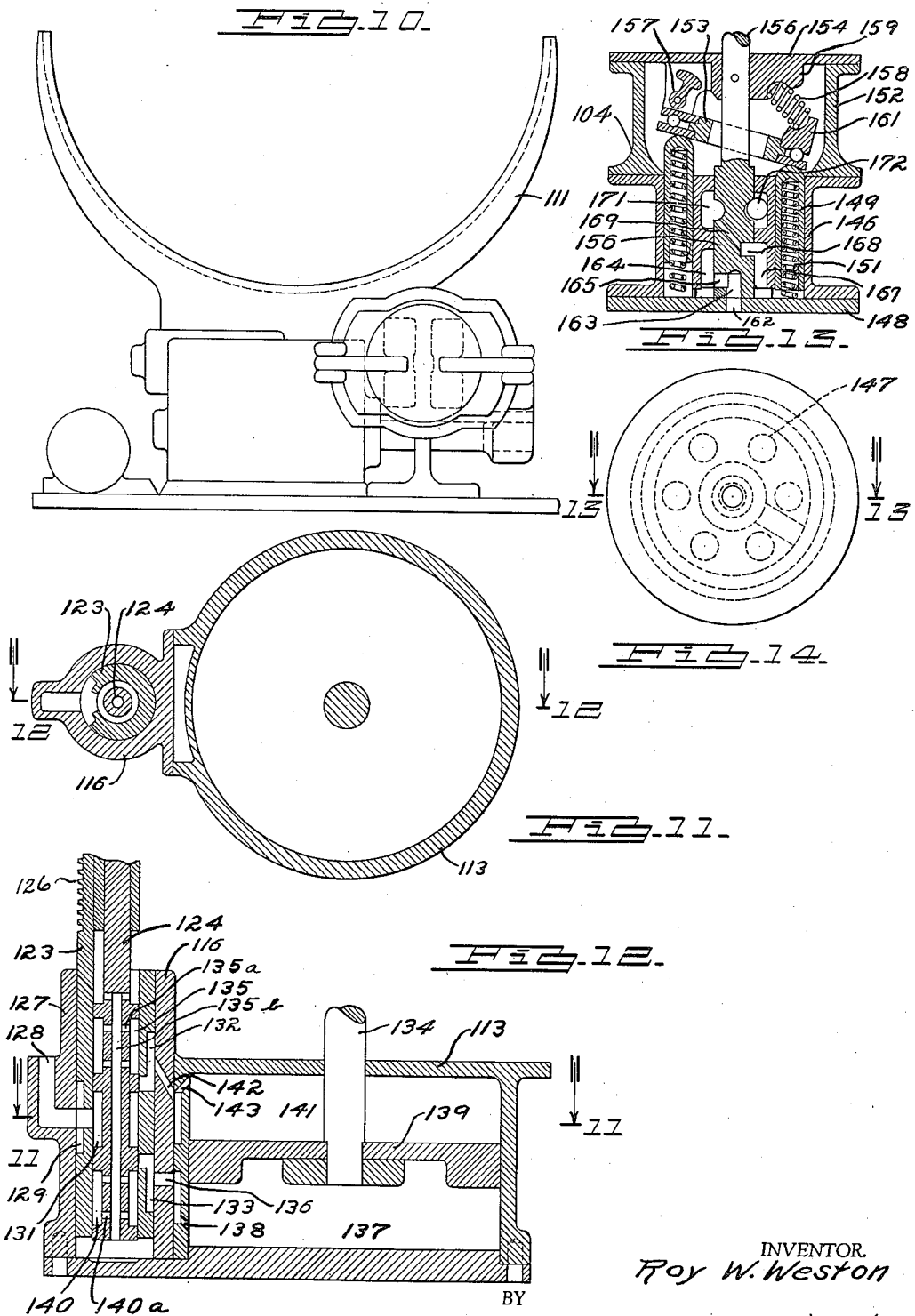
INVENTOR.
Roy W. Weston
BY
Thomas Hughes
ATTORNEY.

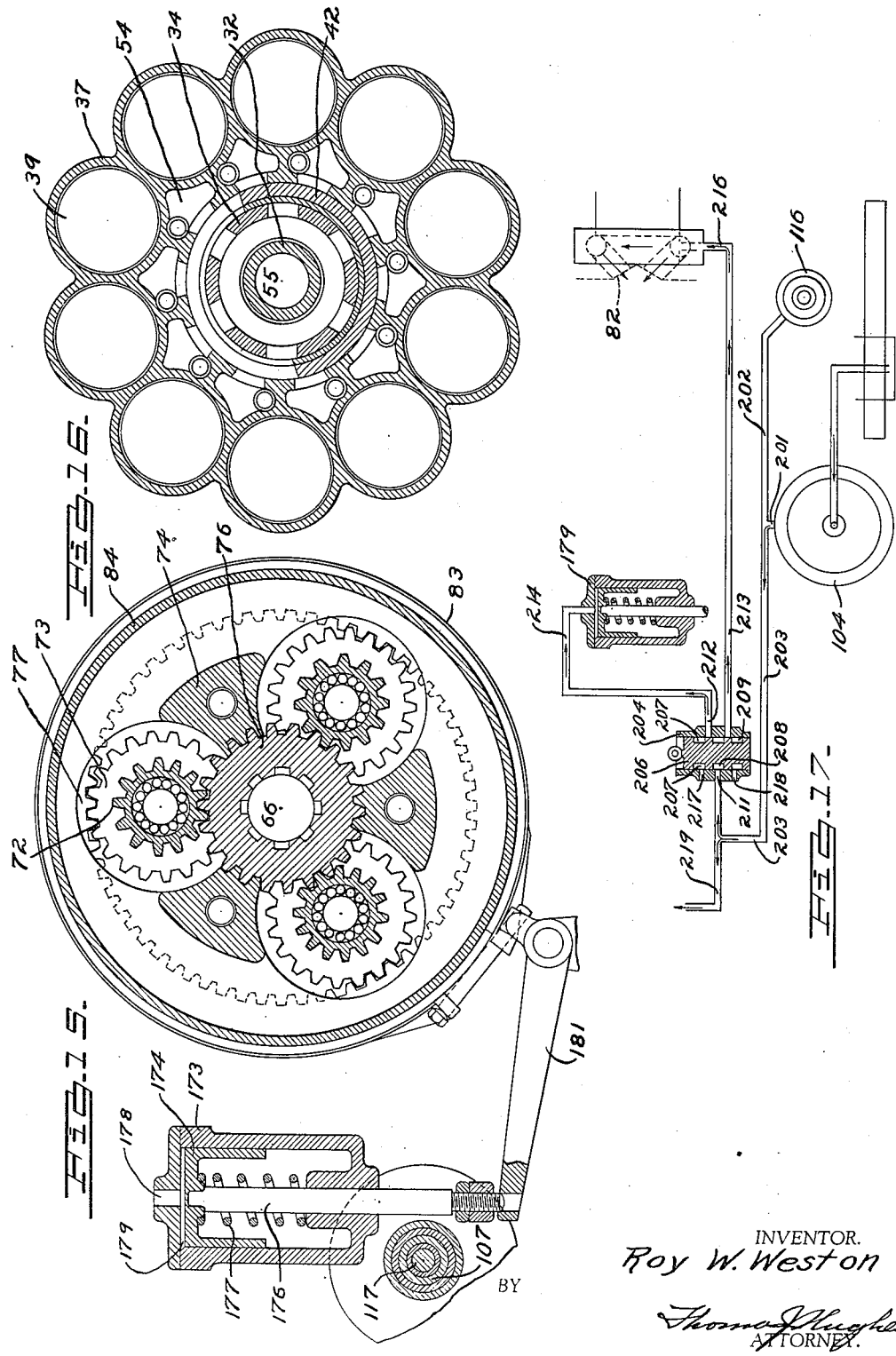

Patented June 30, 1942

2,288,057

UNITED STATES PATENT OFFICE 2,288,057

TRANSMISSION MECHANISM

Roy W. Weston, Flint, Mich.

Application August 10, 1938, Serial No. 224,169

5 Claims. (Cl. 74—189.5)

This invention relates to transmissions of the type used in automotive vehicles.

Transmissions used on automotive vehicles have been almost universally of a design employing so-called step-by-step change in gear ratio accomplished by shifting of gears selected to give the desired mechanical advantage. For most purposes the use of three forward speeds, or steps in gear ratio is considered necessary, the familiar "low, intermediate, and high" generally corresponding to a high ratio for starting, an intermediate ratio, and a one-to-one or overdrive ratio for continuous use on the road. Because of the possible jerking of the car if some skill is not used in shifting and further because of the inherent possibility of uneven change in speed brought about by the step-by-step type of gear ratio mechanism, it has long been considered a possible refinement of design to provide a transmission which would produce a uniform smooth change in gear ratio without provision of steps. Such a mechanism would provide in reality an infinite number of steps to produce a smooth continuous change of ratio. However, many of such mechanisms designed in the past have been of cumbersome mechanical construction or so complicated as to be prohibitive in price.

With the present trend toward the use of automatic transmissions it is important that any transmission be particularly adaptable for automatic operation so that little or no manual skill of the driver is required to produce the required changes in gear ratio.

It is, therefore, a primary object of the present invention to provide a transmission of practical design which will be capable of varying the ratio between the engine and the driving wheels of the vehicle in a continuous change from the highest gear ratio to a direct drive or overdrive ratio without step-by-step gear changes.

It is a further object to provide a transmission design providing for continuous change in gear ratio which is of a size and construction easily adaptable for use in automotive vehicles.

It is another object to provide a transmission mechanism particularly adaptable for automatic operation.

It is a further object to provide a transmission mechanism employing a differential gear unit controlled by fluid pressure operated means.

It is a further object to provide control mechanism for a transmission by control of the relative rotative speed of two rotating shafts by the provision of fluid displacing mechanism controlled by the operation of a fluid pressure operated mechanism.

The above and other objects of the invention will appear more fully from the following more detailed description and by reference to the accompanying drawings forming a part hereof and wherein:

Fig. 1 is a cross section through the transmission housing showing the general arrangement of the several parts of the mechanism.

Fig. 2 is a section taken substantially on the line 2—2 of Fig. 1 and shows the several cylinders and pistons of a hydraulic pump or fluid displacing mechanism.

Fig. 3 is a section taken on the line 3—3 of Fig. 1 and shows that portion of the fly-wheel in which the pump shown in Fig. 2 is housed.

Fig. 4 is a section on the line 4—4 of Fig. 1 and shows the several outlets for the hydraulic pump or fluid displacing mechanism housed in the flywheel and also shows the gear mechanism to assure the proper alignment of the pistons and cylinders of the hydraulic pump.

Fig. 5 is a section on the line 5—5 of Fig. 1 and shows the differential gear unit, which is an important part of the transmission mechanism.

Fig. 6 is a view of the housing for the differential gear unit shown in Fig. 5.

Fig. 7 shows a view of the control mechanism for the transmission as mounted on a panel at the side of the transmission housing.

Fig. 8 is another view of the unit shown in Fig. 7 taken from the top thereof.

Fig. 9 is a view of the units shown in Figs. 7 and 8 but taken on the opposite side of the unit from the view shown in Fig. 8.

Fig. 10 is a view of the eccentric yoke for holding the hydraulic unit ring in position for operation and for varying the eccentricity of the same to change the ratio of the transmission.

Fig. 11 is a section through the control cylinder for operating the hydraulic motor yoke shown in Fig. 10.

Fig. 12 is a section taken on line 12—12 of Fig. 11 and shows further details of the control cylinder with a section through the valve used for operating this cylinder.

Fig. 13 is a cross section through the pump used to produce hydraulic pressure for operating the several control units of the transmission.

Fig. 14 is a top view of this pump showing the arrangement of the several pistons and cylinders therein.

Fig. 15 is a cross-section showing the reverse gearing and mechanism with control therefor.

Fig. 16 is a section thru the hydraulic operated unit showing the plurality of circumferentially located cylinders.

Fig. 17 is a diagram showing the arrangement of the conduit system to feed pressure to the various control units of the transmission.

Referring to the drawings and particularly to Fig. 1, wherein the several parts of the transmission are shown supported in a housing 21 positioned at the rear end of the engine of the vehicle. The most forward positioned rotating part of the transmission is a fly-wheel 22, which may be of substantially the same diameter as the conventional fly-wheel now used and may have combined therewith a starter gear 25, the flywheel 22 being mounted to be rotated by the crankshaft 23 of the engine. In this case, however, the flywheel housing 22 is of such interior construction as to house an hydraulic pumping unit, composed of a plurality of pistons 24 and cylinders 26. In the unit used for illustration there are six of these cylinder and piston units positioned radially in the circular fly-wheel, the cylinders 26 being pivotally mounted on pins 27 and the pistons 24 being connected to the circumference of a crank bearing 28 by means of pins 29. The crank bearing 28 surrounds a crank 31, which crank is secured to rotate with a shaft 32. The crank shown is of two part construction being split at 31a for purpose of facilitating assembly of the unit.

The fly-wheel housing 22 as shown in Fig. 1 has a cone shaped end extension 33, which is secured to a sleeve member 34, which surrounds the aforementioned shaft 32, the sleeve 34 serving as the input shaft of the transmission. Connection between the fly-wheel extension 33 and the input sleeve shaft 34 is effected by means of bolts 36.

For the purpose of keeping the crank 31 in proper alignment with the cylinder and piston units 24, 26 a gear 25 is secured to the shaft 32 adjacent the crank 31. This gear is eccentric with the center of the crank 31 and on rotation of the crank this gear meshes with a gear 25a mounted to rotate with the crank and also meshes with a gear 25b mounted to rotate with the cylinder and piston units. The construction is shown in Figs. 1 and 4 and it is apparent that because of the meshing of the three gears the relative position of the crank and the cylinder and piston units will remain the same, and therefore no misalignment of these units will be possible, although the flywheel and input shaft sleeve 34 may rotate at a different rate than the crank 31 and shaft 32 to which it is attached.

It will be understood from the above description and by reference to Figs. 1 and 3 that the cylinder and piston units in the fly-wheel which have been generally referred to as an hydraulic pump, serve as a means of connection between the fly-wheel which is driven by the engine of the vehicle and the crank 31 which drives the shaft 32. Although the cylinder and piston unit is described as a pump or displacing unit, it really controls the connection between the two aforementioned rotating members and allows relative rotation between them in an amount proportional to the displacement allowed to be made by the pumping unit. In other words, if the fluid is not allowed to flow from the unit, it will result in locking of the fly-wheel with the crank, and require that these two parts turn at the same rate of speed. However, if a certain amount of flow is allowed, the relative amount of rotation will be controlled in proportion to the amount of such flow.

For the purpose of carrying out the idea of controlling the relative rotation by control of fluid flow as above outlined, an hydraulic or fluid operated unit 37 is provided for receiving and regulating the fluid allowed to be displaced by the pumping unit in the flywheel. The unit illustrated in the drawings comprises a plurality of pistons and cylinders 38, 39 mounted to be carried by rotation of input sleeve shaft 34 and fly-wheel 22. The arrangement of the cylinder and piston units is best understood by consideration of Figs. 1 and 16 wherein it appears that the units 38, 39 of the hydraulic unit 37 are secured to the sleeve 34 through a ring 41, which is splined on the sleeve 34 and bolted or otherwise secured to the hydraulic cylinder and piston units. Over the major portion of the length of the hydraulic operated unit a sleeve 42 is interposed between the sleeve 34 and the hydraulic operated unit, this sleeve being secured to the housing 21 by a plurality of bolts shown at 43, a construction which will be evident on inspection of Fig. 1.

As shown in Fig. 1, each of the cylinder and piston units is made up of a pair of opposed cylinder and piston units 38 and 39, each of the two cylinders facing each other and with short pistons positioned so that their semispherical ends 44 and 45 contact a V-shaped reaction ring 46 positioned between the opposed pistons.

Fluid under pressure which actuates the hydraulic motor unit is carried from the fluid displacing pistons 24, 26 by a conduit 47 extending from the end of each cylinder 26 through the cone shaped flywheel extension 33, two of these conduits being shown in section in Fig. 1. The cone shaped extension is so shaped relative to the conduits and these conduits are so terminated as to register with inlet conduits 49 and outlet conduits 51, there being three conduits 49 positioned at equal distances around the semi-circumference of the bearing surface 52 and three outlet conduits around the other semi-circumference of the bearing 52. The three inlet conduits 49 connect with three passages 53 in the sleeve 34, each of which passages opens into a chamber 54 in each of the plurality of cylinder and piston units 38, 39. Each chamber 54 has outlets at both of its ends 56, 57, one of which leads into the cylinder of a cylinder and piston unit 39 and the other of which, 57, leads into the cylinder of a cylinder and piston unit 38. The three outlet conduits 51 connect with the passage 55 in the interior of the shaft 32 and likewise open into the chamber 54 of the cylinder and piston unit previously described.

It will be apparent on inspection of Fig. 1 that on rotation of the fly-wheel 22, assuming for the present that the shaft 32 and the crank 31 are held in stationary position, that the action of the plurality of cylinder and piston units 24, 26 will be to force fluid under pressure into and out of the chamber 54 of the cylinder and piston units of the hydraulic unit. Furthermore, because of the fact that half of the cylinder and piston units 24, 26 are connected with an inlet conduit while the other half are connected to outlet conduits, it becomes apparent that the plurality of circumferentially positioned cylinder and piston units 38, 39 will be successively subjected to pressure as the unit rotates. It follows from the above that the plurality of units will speed of rotation of this carrier and the speed of rotation of the gear 58 and the hydraulic operated unit which rotates it. And considering the central gear unit as a differential gear unit, it will be apparent that as the car picks up speed the gear ratio will gradually decrease. Furthermore, if a control is worked out which will automatically change the position of the reaction ring 46 with this increasing speed the result will be a gradual change in gear ratio from the highest gear ratio to the one-to-one or "high" gear ratio.

It is noted that the device provides change in gear ratio by control of the relative rate of rotation between the differential spider member 59 and the input shaft sleeve 34 with its attached differential gear 58. The plurality of cylinder and piston units 24, 26, located in the flywheel, simply act as a fluid displacing mechanism and in reality serve as a fluid connection between the differential spider 59 and the input sleeve shaft 34. The amount of the displacement allowed by action of the piston units is determined by the control of the hydraulic or fluid operated unit with opposed pistons and cylinders 38, 39. As previously noted any eccentricity of the reaction ring 46 allows a certain amount of displacement of fluid from the cylinder and piston units. When this eccentricity is a maximum there is a maximum difference in rate of rotation between the spider member and the differential gear 58 and the highest gear ratio is afforded for starting the car. However, when there is no eccentricity of the reaction ring 46 no displacement of fluid is allowed and the differential spider member 59 and the differential gear 58 are forced to rotate at the same speed, thereby carrying the entire differential unit around as a unit and effecting a one-to-one ratio for the transmission. Intermediate ratios are obtained by intermediate amounts of eccentricity of the reaction ring 46, thereby allowing some displacement and movement of the piston members and, therefore, some relative movement between the differential gear 58 and the spider member 59. Although it may be stated that the hydraulic or fluid operated unit is operated by the fluid displaced by the plurality of pistons mounted in the flywheel it is also true that the amount of displacement or operation allowed for the hydraulic motor controls the amount of displacement which is allowed to be produced by the cylinder and piston units so in reality the hydraulic unit controls the fluid displacing mechanism in the flywheel, or rather allows it to operate a specified amount. In this way the relative rate of rotation between the shaft which is connected to the spider member and the input shaft sleeve is controlled.

The operation of the reverse unit has previously been described, but it is here noted that the gear ratio change is available in reverse, since the effect of the reverse mechanism is to reverse the drive between the shaft 66 and the output shaft 81, the effect of the central differential gear unit still remaining the same on the reverse drive as in the forward drive. As will later appear, however, the gear ratio change actually afforded will not be identical in reverse and forward drive.

Control mechanism

In order to actuate and control the operation of the transmission described above it is necessary to provide means: (1) to change the eccentricity of reaction ring 46; (2) to actuate band 83 to effect reverse drive; (3) to actuate clutch plates 79. These three controls must be actuated in proper relation to each other and in the mechanism here disclosed fluid under pressure is used as the actuating medium. The several fluid pressure control units are directly actuated by action of fluid under pressure in suitably positioned cylinder and piston units. A pump driven from the transmission maintains a predetermined pressure in a system to which the several actuating units are attached.

In order that the transmission mechanism be automatically operated the piston unit controlling the reaction ring 46 is placed under the control of a governor rotated from the transmission and the action of this governor on the control mechanism is also modified by the throttle position. It can therefore be said that rotative speed and throttle movement both have some determining effect on the gear ratio afforded by the transmission.

With the above outline of the general scheme of control as a basis, the units will be considered in more detail below.

Referring to Figs. 7, 8 and 9, there are shown three different views of the mechanism which is used to control the operation of the transmission. This mechanism is mounted on a plate 100, which as shown in Fig. 5 is mounted on the side of the housing 21. A gear and shaft unit 101 has a spiral gear 102 mounted at the end thereof, this shaft 101 projecting inwardly from the plate 100 on which it is mounted. As shown in Fig. 1 the gear 102 meshes with the gear 103 so that the shaft 101 is rotated from the rotating parts of the transmission. The shaft 101 extends through the plate 100 as shown best in Fig. 9 to an oil pump 104. In addition there is a second spiral gear 106 also mounted on the shaft 101, which gear drives a governor shaft 107 through a gear 108 (see Figs. 7 and 8). The governor 109 is mounted for rotation at the end of the shaft 107.

The above described shaft and gearing provides means to rotate the oil pump 104 and governor 109 from the transmission. It is considered of importance that the connection through gear 103 is such that the governor and oil pump are driven at a reduced speed when the transmission is running idle through the reverse gears 72 which mesh with internal gear 103a to drive gears 103 and 102 (Fig. 1). It is noted that reduction through the reverse gearing occurs only when clutch 79 is released, the gears 103 and 103a being carried with housing 78 when clutch 79 is engaged for forward driving. The reduction also occurs when the reverse gearing is actuated by contraction of member 83. By positioning the governor and oil pump drive as above described suitable drive of the oil pump for idling conditions is assured, as well as for such special conditions as towing the car, etc.

Fig. 10 shows a mounting for a yoke 111, which is of substantially semi-circular shape and of such diameter as to fit on the outside of a bearing 112, which is shown in Fig. 1 as mounted on the reaction ring 46 previously described. It is the movement of this yoke 111 which controls the eccentricity of the reaction ring 46 relative to the axis of rotation of the hydraulic motor unit 37. An assembly view of the yoke 111 with a cylinder and piston unit 113 is shown in Fig. 9, the details of the cylinder and piston unit being shown more completely in Figs. 11 and 12.

have their pistons successively actuated so that the semi-spherical ends thereof will react against the reaction ring 46, the pressure following around the plurality of circumferentially located units. It also follows that displacement of fluid into and out of the fluid operated unit will be allowed only when the reaction ring 46 is eccentric with the axis of rotation of the fluid operated unit. With the ring 46 concentric there will obviously be no movement of the pistons 38, 39 and there can be no displacement of fluid into the fluid operated unit from the units 24, 26 in the flywheel. In this condition of things the crank 31 and shaft 32 will be forced to rotate at the same rate as flywheel 22 and sleeve shaft 34, the fluid in the conduits and cylinders simply serving as a connection. However, if the reaction ring 46 is moved to a position eccentric to the axis of rotation of the unit, the pistons 38, 39 of the plurality of cylinders will be allowed to move successively as the unit rotates and allow a certain amount of displacement of fluid into and out of the fluid operated unit. Such an allowed displacement in the fluid operated unit obviously will allow the pumping units 24, 26 to move and thereby allow relative movement between the crank 31 and flywheel 22. It is obvious that the amount of this allowed displacement and consequent allowed relative movement will vary in proportion to the amount of eccentricity of the ring 46. Means to control this eccentricity is described hereinafter.

A differential gear unit is positioned in the central portion of the housing 21 and by its construction and arrangement provides means to effect change in mechanical advantage, or so called gear ratio, between the input and output shafts of the transmission. A differential gear 58 is secured to the end of the sleeve shaft 34, this sleeve 34 being connected to rotate with the flywheel 22 might therefore be termed an input shaft of the transmission. A second differential gear 64 is secured to rotate with shaft 66 which might be termed an output shaft. Gearing which connects the two differential gears 58 and 64 is mounted on a carrier or spider 59 which is secured to rotate with the previously mentioned shaft 32 which it will be remembered is connected with the crank 31. The spider 59 has a plurality of planetary gears mounted thereon. One set of three of these gears, 61, are equally spaced and mounted to rotate on spider 59 and mesh with differential gear 58. A second set of three planetary gears 63 are here shown as integral with gears 61 and mounted on a shaft 62 carried by spider 59. These last mentioned gears 63 mesh with the second differential gear 64. The gear pairs 61 and 63 act as differential pinion gear but in this case are of suitable relative pitch diameters to provide a desired gear ratio between the input and output shaft which will of course be varied by the differential rotation of the spider and the differential gears. As will later appear the gear ratio is controlled by control of the relative rotation of spider 59 and differential gear 58.

Also mounted on each shaft 62 is a third set of three planetary gears 69 which are secured to rotate with the gears 61 and 63 and to mesh with a gear 68 which is secured to a sleeve 67. The opposite end of the sleeve 67 terminates in a non-reversing unit 71 so that the result of the connection between the differential gear unit and the non-reversing unit thru sleeve 67 is to assure that the differential gear unit can only rotate in one direction and will be held against rotation if it attempts to rotate in the opposite direction.

For the purpose of effecting reverse drive of the transmission two sets of planetary gears 72 and 73 are carried by a spider 74, the set of gears 72 meshing with a gear 76, which is splined to the shaft 66, and the set of gears 73 meshing with an internal gear 77 on the housing of a clutch unit 78. It will later become apparent that the shaft 66 will be rotated from the main differential gear unit, and for forward drive the end of the shaft 66 will be connected to rotate with the clutch housing 78 through clutch plates 79, the housing 78 rotating with the vehicle propeller shaft 81, a portion of which is shown extending from the right hand end of the transmission housing in Fig. 1. The clutch plates 79 are actuated by oil pressure which is fed into the unit through conduit 82, pressure causing plates 79 to be forced together, thereby connecting the end of the shaft 66 and the housing 78. When not held in engagement by oil pressure a spring 75 serves to disengage the clutch plates. It is understood that the clutch plates 79 are of conventional construction, wherein one half the plates are connected to the shaft 66 and the other half or alternate plates are connected to the housing 78. When it is desired to effect reverse drive a band 83 is actuated to stop the rotation of the carrier 74 through the flange 84 and the roller clutch 86. When the carrier 74 is held against rotation mechanism later to be described will release the clutch plates 79 and the drive from the shaft 66 will go through gears 76, planetary gears 72 and 73, and into the internal gear 77 on the clutch housing 78. On inspection of Fig. 1 it will be apparent that this will effect reverse drive and the vehicle propeller shaft 81 will be driven in the opposite direction from that effected by direct connection thru clutch plates 79.

The operation of the unit so far described will now be considered. For this purpose it will be assumed that some type of control is available to hold the reaction ring 46 in a position of maximum eccentricity and to vary the amount of this eccentricity to control the gear ratio of the transmission. Starting with the lowest gear ratio available for starting the car, the engine will rotate the fly wheel 22 since it is directly connected with the crankshaft of the engine, and the action of the cylinder and pistons 24, 26 in the fly-wheel unit will pump fluid into the hydraulic operated unit as previously noted. Since the position of the reaction ring 46 is such as to cause a definite relative rotation between the sleeve 34 and shaft 32 when fluid is pumped into the successive cylinder and piston units, then by such rotation the differential gear 58 connected with the sleeve will be rotated relative to spider 59. Further, since the wheels of the vehicle are only just beginning to turn the carrier or spider 59 of the differential gear unit will be substantially stationary, and therefore the shaft 32 and the crank 31 which is splined to this carrier will also be substantially stationary or just beginning to turn. It is apparent therefore that when the spider 59 is held against rotation or is moving very slowly, and when the gear 58 has a maximum turning effort exerted upon it, there will be a gear ratio between the engine and the output shaft 81 of a maximum amount. However, as the car begins to accelerate the spider 59 will rotate at a faster rate and there will be a less difference between the It is the general plan of control of the transmission that the action of the governor 109, together with the position of the throttle control 114 which is connected through the shaft 115, is used to change the position of the yoke 111 through actuation of a valve unit 116 (Figs. 11 and 12) which controls the flow of fluid under pressure to the aforementioned cylinder and piston unit 113.

Further details of the construction of the governor are shown best in Fig. 7, where it appears that the driving shaft 107 of the governor is in reality a hollow shaft or sleeve through which a second shaft 117 is mounted to slide, this shaft 117 being connected to the governor in such manner as to reflect the speed at which the governor is operating by the longitudinal position of shaft 117 inside the sleeve 107. The shaft 117 has an extension 118 which is connected to the control valve 116 through suitable gearing 119, the throttle control shaft 115 being also connected to the shaft extension 118 by a lever 121, and the movement of both the governor shaft 118 and the throttle control lever 121 being controlled by a spring 122. It is apparent that this double connection of the governor shaft and the throttle control onto the member which is connected to the control for positioning the yoke 111 provides means to change the position of the reaction ring 46 in Fig. 1, so that the gear ratio of the transmission will be changed in proportion to the combined action of the governor and throttle control.

The governor 109 is constructed in such manner that its action is more positive with increase in speed. This result is accomplished by provision of a plurality of arms such as 109a pivoted to swing on a pivot at 109b and so shaped as to provide an end 109c which reacts against a conical shaped plate 109e. A weight 109f is mounted at the end of each arm. It is obvious on consideration of Fig. 7, except for a short initial movement which breaks the flat surface contact inside the end 109c, that as the speed increases and the weights 109f are thrown outward, the end 109c will slide outward on the inclined surface adjacent thereto and the distance from end 109c to pivot 109b will decrease because of the movement of the end 109c on conical plate 109e and will therefore increase the leverage of the weight 109f since the distance from the weight 109f to pivot 109b remains constant. Therefore, the action of the governor will be more positive for the higher speeds because of the greater leverage afforded.

The valve 116 and its connection to operate the yoke 111 is shown in detail in Figs. 11 and 12. It is noted that the valve 116 is made up of two sliding valve parts, an outer sleeve 123 and an inner valve member 124. The outer sleeve 123 is connected to be operated by the governor and throttle control as previously mentioned by a connection effected through the rack 126. The outer housing 127 of the valve 116 has an oil pressure inlet 128 to which fluid under pressure is furnished from the previously mentioned pump 104. The pressure inlet 128 connects with the sleeve 123 so that pressure is fed into a slot 129 cut in the side of the sleeve and for all positions of the sleeve pressure from this slot is furnished to an annular groove 131 which is cut around the central portion of the inner valve member 124. However, the opposite side of the sleeve 123 is of such construction as to cover the entire length of the annular groove 131 but in positions to each side of the groove there is cut in the sleeve 123 an upper port 132 and a lower port 133. These ports are so positioned that when the sleeve 123 is moved in either direction relative to the inner valve member 124 the pressure from the inlet 128 and the annular groove 131 will be allowed to enter either port 132 or 133 depending upon the direction of the movement of the sleeve. The inner valve member 124 is connected with a shaft 134 on which the yoke 111 is mounted, and for instance if the action of the governor and throttle control is to move the sleeve upwards as viewed in Fig. 12, the port 133 will be put in communication with the annular groove 131 and allow pressure to enter therethrough and into a port 136 and into the lower chamber 137 of the cylinder and piston unit 113 through suitable conduit 138. The result of this will be to force a piston 139 upwardly as shown in Fig. 12 and this movement will continue until the sleeve 123 and the inner member 124 are again in alignment to cut off the aforementioned flow of pressure. If the movement of the sleeve 123 is in the opposite direction from that above noted or downwardly as viewed in Fig. 12, pressure will be fed into the upper port 132 and into an upper chamber 141 through suitable conduits 142 and 143. It is obvious on inspection of Fig. 12 that this will cause movement in the opposite direction and allow the yoke 111 to move downwardly as it is viewed in Fig. 10. For the purpose of allowing discharge of fluid from cylinder 141 when cylinder 137 is receiving pressure an annular groove 135 is provided in inner member 124 with drilled opening 135a to a central outlet conduit 135b which drains the fluid to the sump. The same movement of sleeve 123 which connects port 133 with pressure connects port 132 with the outlet as will be apparent on inspection of Fig. 12. Similar annular groove 140 and drilled opening 140a serves as an outlet for the cylinder 137 when cylinder 141 is receiving fluid under pressure.

Considering the action of the valve 116 and its control of the movement of the cylinder and piston unit 113 and the yoke 111, it is apparent that the ultimate result is that the yoke 111 is caused to move a distance determined by the amount of movement imparted to the sleeve 123, following this movement step by step because pressure is fed to the piston unit until the inner valve member 124 which reflects the movement of the yoke 111 becomes again aligned with the sleeve 123.

Reverse mechanism control

As previously noted in the description of the general arrangement of the transmission shown in Fig. 1 reverse drive is accomplished by tightening the band 83 on the flange 84 so that the carrier 74 which supports the gears 72 and 73 is held stationary. In order to produce this tightening of the band 83 the cylinder and piston mechanism 173 shown in Fig. 15 is used. As will be apparent on inspection of this figure, a piston 174 which is secured to a shaft 176 is normally urged in one direction by a spring 177 and for the purpose of urging the shaft 176 against the action of the spring, pressure inlet 178 is provided so that fluid under pressure may be admitted to a chamber 179 to urge the piston 174 and the shaft 176 in a direction against the action of the spring 177. It is this movement of parts above mentioned by the action of the pressure that tightens the band 83 previously mentioned. This is accomplished by a lever 181 which is of a shape and position which is shown best by reference to Fig. 15. The end portion of the lever 181 is so positioned as to act against projecting ends of the band 83 surrounding the flange 84 to contract the band in a manner well known in the art for mechanisms of this character.

Construction of oil pump

The detailed construction of the oil pump 104 is shown in Figs. 13 and 14 of the drawings. The central housing 146 of the pump is substantially cylindrical in shape with flanges at both of its ends. A plurality of cylinders 147 are formed in the housing and positioned so as to be equally spaced in a circle about the center of the housing as shown in the view, Fig. 14. It also appears in Fig. 14 that there are six of these cylinders formed in the housing. The bottom of this housing is covered with a plate 148 as seen in Fig. 13 and this plate covers the bottom end of the cylindrical openings 147. Each cylinder opening is provided with a piston 149 formed with a semi-spherical upper end and having a drilled out central portion to retain a spring 151. It will be noted by reference to Fig. 13 that each of the pistons 149 is normally urged upwardly out of its cylindrical opening 147 by the reaction of the spring on the plate 148 and of the drilled central opening in the piston. A housing 104 is secured to the top flange of the lower housing 146 and provides a wall surrounding a wobble plate unit 153 which is of such diameter as to rotate upon the top of the semi-spherical ends of the six pistons 149. The wobble plate unit 153 is pivotally mounted upon a cover plate 154 which is pinned to rotate with the pump shaft 156. The pivotal connection for the wobble plate is shown at 157 in Fig. 13 and the opposite side of the wobble plate is normally held in a downward position by spring 158 which reacts between a boss 159 on the covering plate 154 and a projection 161 on the wobble plate. As the shaft 156 is rotated, it carries with it the cover plate and the wobble plate unit 153 including the spring 158 on the pivot 157 and from an inspection of Fig. 13 it will be apparent that such rotation will produce successive reciprocation of the six piston units 149. The inner end of the shaft 156 is of such shape as to co-act with inlet and outlet passages in the central portion of the housing 146. As shown in Fig. 13 the inlet to the pump is in the lower central portion thereof and is indicated at 162. This inlet opening connects with the drilled hole 163 in the center of the shaft 156 which is so positioned as to connect with conduits 164 and 165 to allow inlet of fluid to the bottom of cylinders 147 as the shaft rotates. It is understood that rotation of shaft 156 will successively allow fluid to enter the bottom of the six cylinders 147, the relative position of the conduit 165 and the inclination of the wobble plate 153 being such that the inlet of fluid is timed to occur during the intake stroke of the piston and cylinder to which fluid is being admitted. Similarly chamber 167 is provided on the opposite side of the end portion of the shaft 156 and it also serves as a connection with the bottom portion of the cylindrical openings 147 as the shaft rotates, but in this case contact with the cylinder opening is effected at the time when the piston is on its downward or outlet stroke. This action forces the fluid from the cylinders to chamber 167 formed by an opening in the housing and a cut-out portion 168 of the shaft 156. The shaft is also provided with a drilled outlet 169 to an upper chamber 171 and this chamber in turn connects directly with the main outlet 172 from the pump. It will be apparent from the above description and by reference to Figs. 13 and 14 that rotation of the shaft 156 will draw fluid into the inlet 162 and cause this fluid to enter the cylinders 147 during the upward stroke of the pistons 149 and this fluid being eventually forced outwardly through the outlet 172 by the downward stroke of each of the pistons.

In the operation of the above described pump the spring 158 controls the maximum pressure which will be maintained in the outlet from the pump. This result is attained because of the fact that when the pressure from the outlet exceeds a certain amount determined by the spring the spring will allow the wobble plate 153 to assume a position substantially perpendicular to the shaft 156, and it will be evident on inspection of Fig. 13 that in such a position the wobble plate will not cause reciprocation of the several pistons 149. An important advantage of this type of construction is that, regardless of the rate of rotation of the pump shaft 156, the pressure which is generated by the pump will never be built up to a greater value than is allowed by the strength of the spring and it is therefore unnecessary to employ safety valves or other special equipment to limit the pressure in the outlet line.

Fluid pressure system

Fig. 17 shows, in partially diagrammatic form, the conduit connections between the several fluid pressure operated units. As shown in Fig. 17 the pump 104 is the source of fluid pressure and a conduit 201 is connected to the pump outlet. The conduit 201 branches into a conduit 202 which leads to control valve 116 previously described and shown in Fig. 12 as actuating the piston 139 for varying the eccentricity through yoke 111 (Fig. 10). Another branch conduit 203 leads to a manually controlled distributing valve 204, also shown in Fig. 7, as well as Fig. 17. The valve 204 has a sliding central member 206 with three annular grooves 207, 208, 209 cut therein. The valve housing has an inlet 211 to which conduit 203 connects to furnish fluid under pressure. There are two outlets 212, 213 on the opposite side of the housing, the outlet 212 leading to the reverse cylinder 179 through a conduit, and the outlet 213 leading to a collector ring and inlet 82 adjacent clutch 79 (Fig. 1) through a conduit 216. Two outlets 217, 218 in the valve housing are connected with the sump. It is apparent on inspection of Fig. 17 and Fig. 7 that upward movement of the member 206 of the valve will feed pressure to the reverse cylinder 179 by connection of conduit 203 with conduit 214 through inlet 211, annular groove 208, and outlet 212. The same upward movement will connect clutch operating conduit 216 with the sump and release all pressure therein through opening 213, annular groove 209 and outlet 218. Downward movement of the valve member 206 reverses the above arrangement and feeds pressure to operate clutch 79 and release the reverse cylinder 179.

Another branch 219 from conduit 203 leads to the hydraulic motor 37 to assure that some pressure will always be available therein.

It will be apparent that the fluid pressure from conduit 202 assures that pressure will be available at all times to change the eccentricity of the yoke 111 to control the fluid motor 37 and through this to control the gear ratio. On this basic control idea the manual valve 204 is used to set the transmission for reverse operation by releasing clutch 79 and actuating reverse unit 179.

Although I have described my invention as applied to specific mechanism, I do not desire to limit myself to the specific details used for the purpose of illustration, but rather to the scope of the following claims.

I claim:

1. In a transmission mechanism, input shaft, an output shaft, a differential gear connected to rotate with said input shaft, a second differential gear connected to rotate with said output shaft, a differential spider member mounted to rotate between said differential gears, differential pinion gears carried by said spider member and meshing with said differential gears, a fluid displacing mechanism positioned to be actuated by relative rotation between said input shaft and said spider member and designed to allow relative rotation in amount proportional to said fluid displacement, a fluid operated unit carried to rotate with said input shaft having a plurality of opposed pistons and cylinders movable in proportion to the displacement of fluid from said fluid displacing mechanism, a reaction ring, ends of said opposed pistons positioned to contact said reaction ring, means for adjustably supporting said reaction ring at varying amounts of eccentricity from the center of rotation of said fluid motor, thereby to vary the displacement of fluid allowed to be made by said fluid displacing mechanism into said fluid operated unit whereby relative movement is allowed between said input shaft and said spider member to control gear ratio in proportion to the eccentricity of said reaction ring.

2. In a transmission, an input shaft, an output shaft, a hydraulic displacing unit, a hydraulic operated unit, a mechanical gear train operating between said input and output shafts to provide variation in gear ratio in proportion to relative rotation between said output and input shafts, a shaft mounted inside said input shaft for connecting said hydraulic displacing unit to drive the same from a member of said gear train, fluid conduits in said input shaft connecting said displacing unit with said hydraulic operated unit, and a mechanical connection from said hydraulic operated unit to said gear train whereby torque is exerted by said hydraulic motor unit to increase the rotative torque and speed of said output shaft thereby to change the gear ratio.

3. In a transmission mechanism, an input shaft, an output shaft, a differential gear connected to rotate with said input shaft, a second differential gear connected to rotate with said output shaft, a differential spider member mounted to rotate between said differential gears, differential pinion gears carried by said spider member and meshing with said differential gears, a hydraulic displacing unit actuated by relative movement between said spider member and said input shaft, a hydraulic operated motor unit actuated by fluid displaced by said hydraulic displacing unit, and a mechanical connection from said hydraulic operated unit to one of said differential gears whereby torque is exerted by said hydraulic operated unit to increase the rotative torque and speed of said output shaft thereby to change the gear ratio.

4. In a transmission, an input shaft, an output shaft, a mechanical gear train operating between said input and output shafts to provide variation in gear ratio in proportion to relative rotation between said output and input shafts, a hydraulic displacing unit operated in proportion to difference in rotation of said input and output shafts, a hydraulic operated unit rotatable by displacement of said hydraulic displacing unit, an adjustable reaction member for said hydraulic operated unit, and a mechanical connection from said hydraulic operated unit to said gear train whereby torque is exerted by said hydraulic operated unit to increase the rotative torque and speed of said output shaft thereby to change the gear ratio.

5. In a transmission mechanism, an input shaft, an output shaft, a differential gear connected to rotate with said input shaft, a second differential gear connected to rotate with said output shaft, a differential spider member mounted to rotate between said differential gears, differential pinion gears carried by said spider member and meshing with said differential gears, a fluid displacing mechanism positioned to be actuated by relative rotation between said input shaft and said spider member and designed to allow relative rotation in amount proportional to said fluid displacement, a fluid operated unit having members movable in proportion to the displacement of fluid from said fluid displacing mechanism, and control means for said fluid operated unit comprising a reaction ring positioned to contact one of said movable members of said fluid operated unit, means for adjustably supporting said reaction ring in varying amounts of eccentricity from said movable member, thereby to vary the displacement of fluid allowed to be made by said fluid displacing mechanism into said fluid operated unit whereby relative movement is allowed between said input shaft and said spider member to control gear ratio in proportion to the eccentricity of said reaction ring.

ROY W. WESTON.